Patented July 19, 1949

2,476,785

UNITED STATES PATENT OFFICE 2,476,785

ALCOHOLIC FERMENTATIONS IN THE PRESENCE OF INORGANIC ADSORBENTS

Leo Wallerstein, New York, N. Y., assignor to Wallerstein Company, Inc., New York, N. Y., a corporation of New York No Drawing. Application September 7, 1945, Serial No. 615,086

5 Claims. (Cl. 195—116)

This invention relates to improvements in the art of fermentation.

In the typical alcoholic fermentation of mashes prepared from certain grains, there is frequently encountered an objectionable condition. Fermentation by the yeast is found to be sluggish or even retarded to such an extent as practically to cease at an early stage. Even under less extreme conditions growth of contaminating microorganisms may then occur at such a rate as to cause the conversion of a substantial part of the carbohydrate material into undesirable by-products. For example, lactic acid instead of alcohol is produced in appreciable quantities, whereby reduced yields of alcohol are obtained.

The condition referred to is more regularly encountered in the fermentation of wheat and more particularly granular wheat. Granular wheat, used as raw material for alcoholic production on an increasing scale in recent years, is a milled wheat from which a portion of the bran has been removed.

It has been known for some time that there is present in certain grains, especially wheat, some toxic principle capable of inhibiting fermentation. More recently the isolation from wheat of a substance having toxic properties toward yeast has been reported. (Cereal Chemistry 19, 288, 1942.) Whether these factors are chiefly responsible has not been fully determined but in any event it is a more or less common experience in industrial fermenation plants using wheat to find considerable variation in yield and behavior in the fermentation of different lots of wheat. Some lots may show the condition mentioned to so marked a degree that when customary mashing methods are used, fermentation starts feebly and soon stops. This result is particularly marked if the grain is mashed without cooking and with minimal proportions of malt. It is my belief that in many cases faulty fermentation behavior and consequent low yield have been erroneously ascribed to bacterial infection as the primary cause.

It has been found that the objectionable conditions can sometimes be corrected to some degree by various expedients such as the use of salts, higher proportions of malt for premalting and conversion, and long and intense cooking. Such procedures, however, are not practical. It is usually desirable to avoid pressure cooking or even atmospheric cooking, for various reasons. For example, such cooking usually requires special equipment and the use of undue quantities of steam. Moreover, such procedures often induce other undesirable reactions which unfavorably affect the yield.

It is an object of the present invention to provide a treatment whereby the objectionable and disadvantageous conditions above referred to may be avoided.

More particularly it is an object of the invention to provide a treatment in the alcoholic fermentation of grains such that proper fermentative activity and a high alcoholic yield may be obtained in a simple, effective and economical manner.

Additional objects and advantages of the invention will be apparent from the ensuing description.

In accordance with the invention I subject the material being processed to the action of a mineral substance which may be described as more or less clay-like. An example of such a substance is kaolin. While the kaolin or other mineral substance may be added at any suitable stage prior to completion of fermentation, I have found that addition during mashing or in the earlier stages of fermentation gives particularly satisfactory results. For commercial reasons it may be advantageous to supply the clay-like mineral substance by adding it during milling of the grain that is to be used for mashing. Such procedure would enable the miller to furnish a raw material which could be depended upon to result in normal fermentation and excellent yields.

The relative proportion of kaolin or other substance used may vary within a considerable range but I have found that amounts of the order of 1% of the grain weight ordinarily give suitable and satisfactory results. In case the kaolin or other mineral substance is supplied by adding it to the grain during milling, the mixture should contain around 1–2% of the mineral substance to 99–98% of grain.

Instead of kaolin, other mineral substances may be used, for example, bleaching earths, including Fullers earth and a commercial product sold under the trade name "Filtrol," and the material commonly known as bentonite or Wyoming bentonite. This latter is composed chiefly of the mineral montmorillonite, a hydrous silicate of alumina. All these materials are characterized by having marked adsorbent properties. It is noted, however, that the beneficial results obtained do not depend merely on the use of an adsorbent. I have found that various adsorbents such, for example, as activated carbon and synthetic resin adsorbents fail to attain the desired results.

When the treatment described is used in the alcoholic fermentation of granular wheat, the result is a great increase in fermentative activity, with the production of high yields of alcohol, regardless of variations in the lots of grain used. Even with lots of grain so abnormal, in the respects above referred to, that only very low yields of alcohol are obtainable with customary procedure, the treatment here described makes possible a yield as great as or even greater than to be expected of normally good grain. I have made comparative tests in the fermentation of different lots of granular wheat, with and without the treatment of the present invention. These tests show that in the case of a wheat particularly poor in the respects above mentioned, the fermentation became normal and alcoholic yield was increased by as much as 700% by the treatment here described. Moreover, these beneficial results are obtained without long or intense cooking and without undue proportions of malt or resort to the other expedients previously mentioned.

Whether the reactions involved in the treatment described represent merely some interaction with toxic principles of the type mentioned is not fully determined but it is to be assumed that is some way the treatment effects a counteracting of those toxic principles. While the invention has been described more particularly in connection with alcoholic fermentation of granular wheat, it is to be understood that the invention is not limited to the use of granular wheat or to alcoholic fermentation. It is generally considered that granular wheat contains the above mentioned toxic principles to a greater extent than other types of wheat or other grains and I have found that the relative improvement in fermentative activity and the relative increase in yield, under the treatment described, is greater in the case of granular wheat. However, it is believed that these same variations in behavior and yield occur, to some degree, in the case of whole wheat and other grains and I have found that the treatment here described can be used to advantage in the fermentation of whole wheat and rye, for example.

I claim:

1. In the alcoholic fermentation of mashes prepared from a grain selected from the group consisting of wheat and rye by the action of yeast thereon, the improvement which consists in adding to the mash, prior to completion of fermentation, a relatively small amount of the order of 1% of the amount of grain in the mash of a substance selected from the group consisting of kaolin, bleaching earth, fuller's earth and bentonite.

2. In the alcoholic fermentation of mashes prepared from wheat by the action of yeast thereon, the improvement which consists in adding to the mash, prior to completion of fermentation, a relatively small amount of the order of 1% of the amount of grain in the mash of a substance selected from the group consisting of kaolin, bleaching earth, fuller's earth and bentonite.

3. In the alcoholic fermentation of mashes prepared from wheat by the action of yeast thereon, the improvement which consists in adding a relatively small amount of the order of 1% of the amount of grain in the mash of kaolin to the mash prior to completion of fermentation.

4. In the alcoholic fermentation of mashes prepared from wheat by the action of yeast thereon, the improvement which consists in adding a relatively small amount of the order of 1% of the amount of grain in the mash of bleaching earth to the mash prior to completion of fermentation.

5. In the alcoholic fermentation of mashes prepared from wheat by the action of yeast thereon, the improvement which consists in adding a relatively small amount of the order of 1% of the amount of grain in the mash of bentonite to the mash prior to completion of fermentation.

LEO WALLERSTEIN.

REFERENCES CITED

The following references are of record in the file of this patent:

UNITED STATES PATENTS

| Number | Name | Date |
|---|---|---|
| 2,291,624 | Heimann et al. | Aug. 4, 1942 |

FOREIGN PATENTS

| Number | Country | Date |
|---|---|---|
| 396,968 | Great Britain | Aug. 17, 1933 |

OTHER REFERENCES

Cereal Chemistry, vol. 21, January 1944, pages 74–80, by Balls & Harris.

Rogers, Indust. Chem., 3rd edition, page 919.